(12) United States Patent
Liu

(10) Patent No.: US 11,569,050 B2
(45) Date of Patent: Jan. 31, 2023

(54) KEYBOARD CONTAINING AIRBAG AND METHOD FOR ADJUSTING TACTILE FEEDBACK TO USER OPERATING THE KEYBOARD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/571,896

(22) Filed: Jan. 10, 2022

(65) Prior Publication Data

US 2022/0254583 A1    Aug. 11, 2022

(30) Foreign Application Priority Data

Feb. 8, 2021    (CN) .......................... 202110171106.8

(51) Int. Cl.
*H01H 13/14* (2006.01)
*H01H 13/7073* (2006.01)
*H01H 13/85* (2006.01)

(52) U.S. Cl.
CPC ........ *H01H 13/7073* (2013.01); *H01H 13/85* (2013.01); *H01H 2211/002* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 2201/036; H01H 13/86; H01H 13/807; H01H 13/84; H01H 13/785; H01H 13/702; H01H 2221/038; H01H 2211/002; H01H 2227/034; H01H 2223/052; G06F 1/1622; G06F 1/1666; G06F 1/1671; G06F 1/1679; G06F 3/0221

See application file for complete search history.

(56) References Cited

U.S. PATENT DOCUMENTS

| 4,795,888 | A | * | 1/1989 | MacFarlane | ............... | B41J 5/26 |
| | | | | | | 235/145 R |
| 5,459,461 | A | * | 10/1995 | Crowley | ............... | G06F 3/0221 |
| | | | | | | 400/491.1 |

(Continued)

*Primary Examiner* — Ahmed M Saeed
(74) *Attorney, Agent, or Firm* — ScienBiziP, P.C.

(57) ABSTRACT

A keyboard includes a substrate, a plurality of key structures, and an air pump. Each key structure includes a keycap disposed on the substrate, an air bag between the keycap and the substrate, and an electrical contact point between the keycap and the substrate. The airbag deformed when the keycap moves towards the substrate, applying a reaction force onto the substrate, and returns to an original state when the keycap is released. The air pump can adjust an air pressure in the airbag by charging or allowing discharge of air, so as to adjust the force applied by the deformed airbag to the substrate, thereby adjusting a tactile feedback to user for pressing the keycap.

19 Claims, 2 Drawing Sheets

(56) References Cited

U.S. PATENT DOCUMENTS

| | | | |
|---|---|---|---|
| 5,879,088 A * | 3/1999 | English | G06F 3/0202 |
| | | | 200/306 |
| 6,019,530 A * | 2/2000 | Lanzetta | G06F 1/1666 |
| | | | 400/495.1 |
| 6,052,071 A * | 4/2000 | Crowley | H01H 13/807 |
| | | | 200/86 R |
| 6,107,995 A * | 8/2000 | Dordick | G06F 3/0221 |
| | | | 361/679.13 |

* cited by examiner

KEYBOARD CONTAINING AIRBAG AND METHOD FOR ADJUSTING TACTILE FEEDBACK TO USER OPERATING THE KEYBOARD

FIELD

The subject matter herein generally relates to human interface devices, and more particularly, to a keyboard containing an airbag, and a method for adjusting a tactile feedback to a user operating the keyboard.

BACKGROUND

Since different keycaps of a keyboard have a same structure, the strengths for pressing down the keycaps are almost the same. However, different fingers of one hand may have different strengths (for example, an index finger has a maximal strength, and a little finger has a minimal strength) when operating the keyboard. Even a single finger may have different strengths when pressing the keyboard from different directions. The little finger for example may not be able to type by fast pressing on the keycaps.

Therefore, there is a room for improvement in the art.

BRIEF DESCRIPTION OF THE DRAWINGS

Implementations of the present technology will now be described, by way of embodiment, with reference to the attached figures.

DETAILED DESCRIPTION

Figure 1:
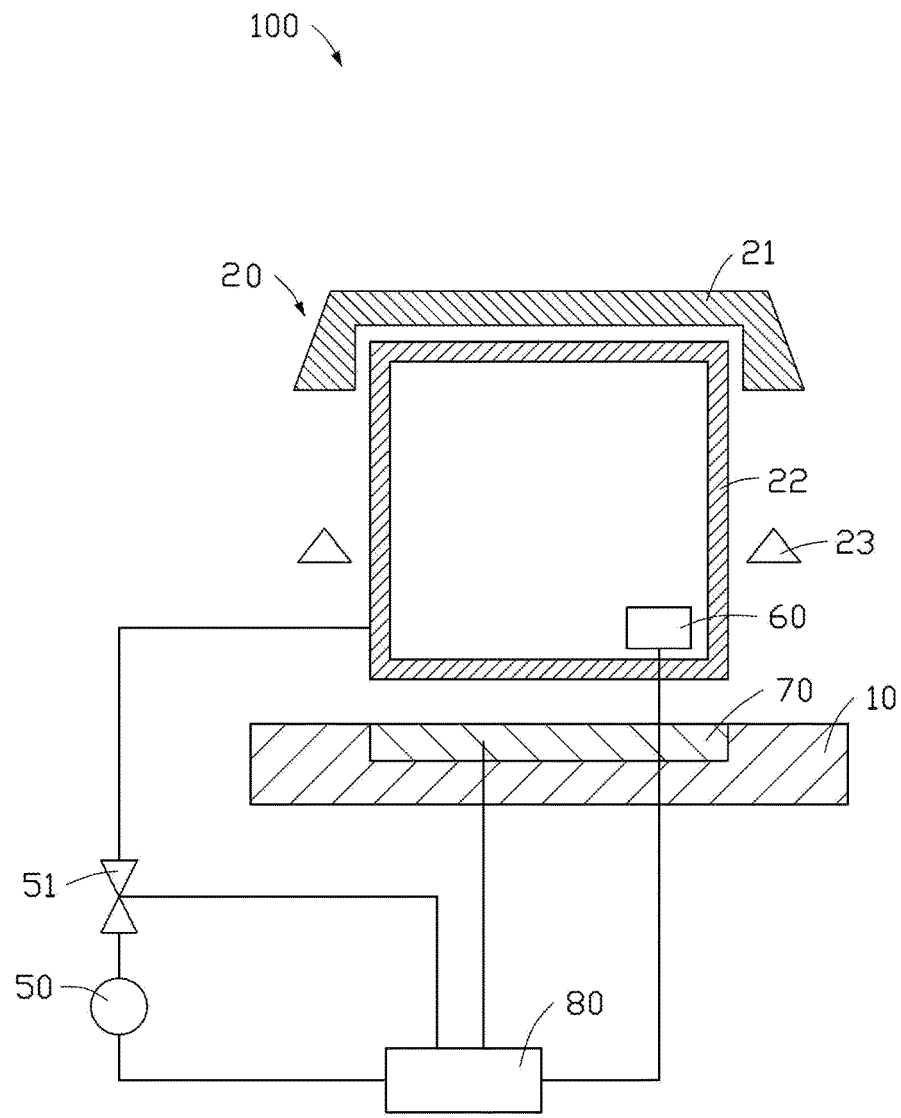
FIG. 1 is a diagrammatic view of an embodiment of a keyboard according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
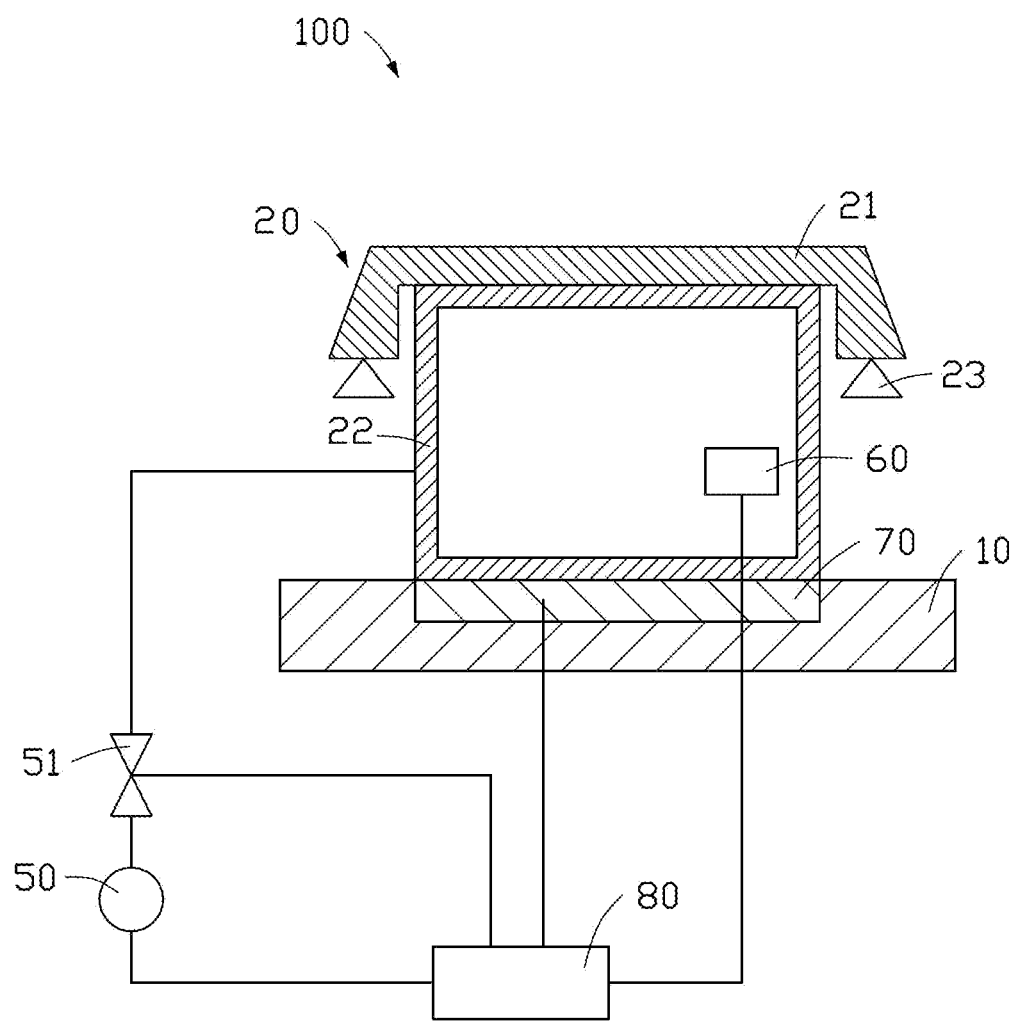
FIG. 2 is similar to FIG. 1, but showing the keyboard in another state.

Referring to FIGS. 1 and 2, an embodiment of a keyboard 100 is provided according to the present disclosure. The keyboard 100 includes a substrate 10, a number of key structures 20 disposed on the substrate 10, and an air pump 50. Each key structure 20 includes a keycap 21, an airbag 22, and at least one contact point 23. The keycap 21 is disposed above the substrate 10, and can move up and down relative to the substrate 10. The airbag 22 is disposed between the keycap 21 and the substrate 10. The contact point 23 is fixed between each keycap 21 and the substrate 10. The contact point 23 can get in contact with the keycap 21 when the keycap 21 is pressed to a lowermost position, and generate an input instruction accordingly. The air pump 50 connects to the airbag 22 of each key structure 23, and can inflate the airbag 22 by air charging or deflate by discharging. In an embodiment, each key structure 20 includes a pair of contact points 23.

When the keycap 21 is pressed down to get in contact with the contact point 23, the keycap 21 and the substrate 10 can cooperatively compress the airbag 22, causing the airbag 22 to deform. The deformed airbag 22 will then apply a reaction force upwardly on the keycap 21, and such reaction force relates to the air pressure in airbag 22. The deformed airbag 22 also exerts another reaction force downwardly on the upper surface of the substrate 10, and such reaction force is related to a tactile feedback to a user when pressing the keycap 21. After the keycap 21 is released, the airbag 22 returns (rebounds) to its original state. Since the air pump 50 can adjust the air pressure in airbag 22, the reaction force of the airbag 22 applied to the substrate 10 can also be adjusted accordingly, thereby changing at the same time the tactile feedback of pressing the keycap 21.

An embodiment of a method for adjusting a tactile feedback to the user is also provided according to the present disclosure. The method is described as follows.

When the keycap 21 is in its original unpressed state (that is, the airbag 22 is not deformed), the air pump 50 adjusts the air pressure in the airbag 22 to a preset value $P_0$ by air charging or discharging. The temperature in the airbag 22 is $T_0$, the reaction force of the airbag 22 applied to the substrate 10 is 0. The original volume of the airbag 22 before deforming is $V_0$. At this time, the following formula 1 can be obtained according to Clapeyron equation:

$$\frac{P_0 \times V_0}{T_0} = n_0 R \quad (1)$$

Wherein, $n_0$ denotes the amount of air in a preset state, and R is a known constant.

Then, the keycap 21 is pressed, causing the airbag 22 to deform. A contact area between the keycap 21 and the airbag 22 is known as S. When the keycap 21 reaches the lowermost position and makes contact with the contact point 23, the airbag 22 has a maximum deformation, and the air pressure in the airbag 22 increases from $P_0$ to $P_1$. Under the condition that the ambient temperature remains unchanged, the temperature in the airbag 22 becomes $T_1$, and the reaction force of the deformed airbag 22 applied to the substrate 10 becomes $F_1$. Assuming that the volume of the deformed airbag 22 is $V_1$, and the pressing force of the finger for pressing the keycap 21 is $F_0$, the following formula 2 can be obtained:

$$F_0 = P_1 \times S + F_1 \quad (2)$$

Since the amount of air in the airbag 22 remains unchanged, the following formula 3 can be obtained according to Clapeyron's equation:

$$\frac{P_1 \times V_1}{T_1} = n_0 R \quad (3)$$

Furthermore, when a desired tactile feedback is achieved, the reaction force of the airbag 22 applied to the substrate 10 is denoted as $F_s$, and $F_s$ is a known value. The larger the value that $F_s$ is, the larger the value of required pressing force for pressing the keycap 22. Otherwise, the smaller the value that $F_s$ is, the smaller the value of pressing force. Under the condition that the pressing force $F_0$ of the finger for pressing the keycap 21 remains unchanged, and assuming that the air pressure in the deformed airbag 22 needs to be $P_{ideal}$ to obtain the reaction force $F_s$, the following formula 4 can be obtained:

$$F_0 = P_{ideal} \times S + F_s \qquad (4)$$

The following formula 5 can be obtained from Formula 2 and Formula 4:

$$F_0 = P_1 \times S + F_1 = P_{ideal} \times S + F_s \qquad (5)$$

$P_{ideal}$ can be calculated from Formula 5, which is shown in the following formula 6:

$$P_{ideal} = \frac{P_1 \times S + F_1 - F_s}{S} \qquad (6)$$

Assuming that the air pressure in the deformed airbag 22 is $P_{ideal}$, the temperature in the deformed airbag 22 is $T_{press}$. After the airbag 22 returns to its original state, the air pressure in the airbag 22 is $P_2$, the temperature in the airbag 22 is $T_{relax}$. Since the amount of air in the airbag 22 before and after deforming remains unchanged, the following formula 7 can be obtained according to Clapeyron's Equation:

$$\frac{P_2 \times V_0}{T_{relax}} = \frac{P_{ideal} \times V_1}{T_{press}} = n_1 R \qquad (7)$$

Wherein, $n_1$ denotes the amount of air in the airbag 22 under the desired tactile feedback, R is a known constant. Since a travelling path of the keycap 21 remains unchanged, the volumes $V_0$ and $V_1$ of the airbag 22 are also constants. Furthermore, when the ambient temperature remains unchanged, the temperature in the deformed airbag 22 is basically the same as that in the undeformed (rebounded) airbag 22 even if the air pressures therein are different from each other. Thus, the following formula 8 can be obtained:

$$T_{relax} = T_0, T_{press} = T_1 \qquad (8)$$

The following formula 9 can be obtained from formula 7 and formula 8:

$$\frac{P_2 \times V_0}{T_0} = \frac{P_{ideal} \times V_1}{T_1} \qquad (9)$$

The following formula 10 is obtained from Formula 9:

$$P_2 = \frac{P_{ideal} \times V_1 \times T_0}{T_1 \times V_0} \qquad (10)$$

When $V_0$ and $V_1$ are not known constants, the following formula 11 can be obtained according to formula 1 and formula 3:

$$\frac{P_0 \times V_0}{T_0} = \frac{P_1 \times V_1}{T_1} \qquad (11)$$

A ratio of $V_0$ and $V_1$ can be obtained according to formula 11, which is as shown in the following formula 12:

$$\frac{V_1}{V_0} = \frac{P_0 \times T_1}{P_1 \times T_0} \qquad (12)$$

The following formula 13 can be obtained from formula 6, formula 12, and formula 10:

$$P_2 = \left| \frac{(P_1 \times S + F_1 - F_s) \times P_0}{P_1 \times S} \right| \qquad (13)$$

That is, after the keycap 21 is released, the air pressure in the airbag 22 can be adjusted to $P_2$ by air charging or discharging through the air pump 50. Under the condition that the strength for pressing the keycap 21 is the same every time, when the keycap 21 is pressed to get in contact with the contact point 23, the reaction force of the airbag 22 applied to the substrate 10 becomes the target reaction force $F_s$, thereby achieving the desired tactile feedback.

In an embodiment, the values of the target reaction force $F_s$ can be graded as "strong", "medium", and "weak" corresponding to different tactile feedbacks. Assuming that the finger presses the keycap 21 with a constant strength, when the air pressure in the airbag 22 is smaller, the reaction force of the airbag 22 applied to the keycap 21 is also smaller, but the reaction force $F_s$ of the airbag 22 applied to the substrate 10 is bigger, which indicates a stronger tactile feedback. Otherwise, when the air pressure in the airbag 22 is greater, the reaction force $F_s$ of the airbag 22 applied to the substrate 10 is smaller, which indicates a weaker tactile feedback. At a first use of the keyboard 100, the step to determining the value of $P_2$ is actually a calibration step. That is, assuming that the position of the hand is the same as usual, and the finger used to press the corresponding keycap 21 is according to usual typing habit and strength, then the value of $P_2$ can be determined for the airbag 22 under each keycap 21.

Referring to FIGS. 1 and 2, in an embodiment, the keyboard 100 further includes a number of air pressure sensors 60, a number of pressing force sensors 70, and a controller 80. Each air pressure sensor 60 is disposed in one airbag 22, and can measure the air pressure in the airbag 22. Each pressing force sensor 70 is disposed on the substrate 10 and faces the airbag 22, and can measure the reaction force of the airbag 22 applied to the substrate 10. The controller 80 can receive the data from the air pressure sensors 60 and the pressing force sensors 70, and calculate the value of $P_2$ accordingly. If the value of $P_2$ is greater than the preset value $P_0$, the controller 80 controls the air pump 50 to inflate the airbag 22. If the value of $P_2$ is less than the preset value of $P_0$, the controller 80 controls the air pump 50 to deflate the airbag 22.

In an embodiment, the keyboard 100 further includes a number of valves 51. Each valve 51 connects between the air pump 50 and one airbag 22, and also connects to the controller 80. If the controller 80 closes the valve 51, the air pressure in the airbag 22 remains constant. If controller 80 opens the valve 51, the air pump 50 communicates with the airbag 22 for air charging or discharging.

Since different fingers may press the corresponding keycaps 21 with different strengths or along different directions, the value of the target air pressure $P_2$ of each keycap 21 is different from each other. The controller 80 can record the target pressure $P_2$ corresponding to the airbag 22 of each keycap 21, and form a mapping relationship between keycaps 20 and the target pressures $P_2$. Before a user initiates operation of the keyboard 100 each time, the controller 80 adjusts the air pressure in each airbag 22 to the corresponding target air pressure $P_2$ according to the mapping relationship.

In an embodiment, each time the user initiates operation of the keyboard 100, the controller 80 controls the air pump 50 to adjust the air pressure in each airbag 22 to the target air pressure $P_2$ by air charging. Then, the controller 80 closes the valves 51. In other embodiments, each time the user initiates operation of the keyboard 100, the controller 80 first adjusts the air pressure in each airbag 22 to the preset air pressure $P_0$, then closes all valves 51, and then opens the valves 51 in turn to adjust the air pressure in each airbag 22 to the corresponding target air pressure $P_2$ according to the mapping relationship. In other embodiments, a number of air pumps 50 can be included, and each airbag 22 can connect to one air pump 50. Each time the user initiates operation of the keyboard 100, the controller 80 simultaneously adjusts the air pressures of all airbags 22 to the corresponding target pressures $P_2$ according to the mapping relationship. When the keyboard 100 is not in use, the valves 51 remains closed to maintain air pressure in each airbag 22.

In an embodiment, after the air pressure in the airbag 22 is adjusted to $P_2$, if the ambient temperature increases or decreases (for example, electronic components generate local heat, or the electronic components are locally cooled), the pressing force sensor 70 senses that the maximum reaction force of the airbag 22 applied to the substrate 10 changes to $F_2$, and the air pressure sensor 60 senses that the air pressure in the deformed airbag 22 changes to $P_3$, and the air pressure in the undeformed airbag 22 changes to $P_4$. Then, the controller 80 controls the air pump 50 to adjust the air pressure in the undeformed airbag 22 to be $P_2'$, which meets the following formula 14:

$$P_2' = \left| \frac{(P_3 \times S + F_2 - F_s) \times P_4}{P_3 \times S} \right| \qquad (14)$$

That is, after the keycap 21 is released, the air pressure in the airbag 22 can be adjusted to $P_2'$. When the keycap 21 is pressed by a same strength, the reaction force of the deformed airbag 22 applied to the substrate 10 is still $F_s$. Thus, the change of temperature does not affect the air pressure in the airbag 22 and the desired tactile feedback is still given.

In order to determine whether the change of air pressure in the airbag 22 is a result of a change of temperature or a result of leak of the airbag 22 and/or the valves 51, the keyboard 100 can further include a number of temperature sensors (not shown). Each temperature sensor is disposed in one airbag 22. In other embodiments, only one temperature sensor is included, which is disposed on the substrate 10. When the air pressure sensor 60 detects a change of air pressure in the airbag 22 both in the deformed state and the undeformed state, the controller 80 determines whether the sensed temperature from the temperature sensor also changes. If the sensed temperature changes, it indicates that pressure change in the airbag 22 is caused by the change of temperature. If the sensed temperature does not change, the change of air pressure in the airbag 22 must be caused by the leak of the airbag 22 or the valve 51, and controller 80 issues an alarm to user. In other embodiments, the temperature sensor can also sense the temperature within the airbag 22 in real time, and adjust the air pressure in the airbag 22 in time according to the sensed temperature.

In an embodiment, after the air pressure in the airbag 22 is adjusted to $P_2$, if the strength for pressing the keycap 21 increases or decreases (for example, a finger may apply different strengths in the morning, noon, afternoon, and at night), the pressing force sensor 70 may sense that the maximum reaction force of the deformed airbag 22 applied to the substrate 10 changes to $F_3$, and the air pressure sensor 60 may sense that the air pressure in the deformed airbag 22 changes to $P_5$ (the air pressure in the undeformed airbag 22 is still $P_2$). Then, the controller 80 controls the air pump 50 to adjust the air pressure in the undeformed airbag 22 to be $P_2''$, which meets the following formula 15:

$$P_2'' = \left| \frac{(P_5 \times S + F_5 - F_s) \times P_2}{P_5 \times S} \right| \qquad (15)$$

That is, after the keycap 21 is released, the air pressure in the airbag 22 can be adjusted to $P_2''$. Under the condition that the strength for pressing the keycap 21 remains unchanged each time, when the keycap 21 is pressed to get in contact with the contact point 23, the reaction force of the deformed airbag 22 applied to the substrate 10 is still $F_s$. Thus, adjustment of the force of the tactile feedback is achieved.

In an embodiment, each time the keycap 21 is pressed, the pressing force sensor 70 detects the maximum reaction force of the deformed airbag 22 applied to the substrate 10 as $F_n$, and the air pressure sensor 60 detects the air pressure in the deformed airbag 22 as $P_n$. Then, the controller 80 calculates and records the pressing force $F_0$ for pressing the keycap 21 each time, which meets the following formula 16:

$$F_0 = P_n \times S + F_n \qquad (16)$$

The controller 80 collects the pressing forces $F_0$ in a period of time that follow a normal distribution, and calculates an average pressing force $F_a$ of the pressing forces $F_0$ within a certain confidence interval. The controller 80 then adjusts the air pressure in the undeformed airbag 22 to $P_2'''$, which satisfies the following formula 17:

$$P_2''' = \left| \frac{(F_a - F_s) \times P_0}{P_1 \times S} \right| \qquad (17)$$

That is, before operating the keyboard 100, the air pressure in the undeformed airbag 22 can be first adjusted to $P_2'''$. During the period when the pressing forces $F_0$ follow the normal distribution, each time the keycap 21 is pressed into contact with the contact point 23, the reaction force of the deformed airbag 22 applied to the substrate 10 is still $F_s$. Thus, the adjustment of the force of tactile feedback is achieved. For example, if the pressing forces $F_0$ within an hour follow the normal distribution, an average pressing force of the pressing forces $F_0$ within 68% of the confidence interval is calculated as the average force $F_a$ within the hour. The confidence level can also be 95%, 99%, etc.

In an embodiment, the controller 80 can store the pressing forces $F_0$ that follow the normal distribution and the corresponding average pressing force $F_a$ at different time periods each day. The different time periods each day may mean the morning, noon, afternoon, and night each day. The air pressure in the airbag 22 can be adjusted to $P_2'''$ corresponding to $F_a$ at a specific time periods each day. For example, the controller 80 stores the pressing forces $F_0$ that follow the normal distribution and the corresponding average pressing force $F_a$ at night, and collects the average pressing forces $F_a$ of all keycaps 20 to form a mapping relationship for nighttime use. Thus, each time before the user initiates operation of the keyboard 100 at night, the controller 80 adjusts the air pressure in the airbag 22 according to the night-time mapping relationship.

In the present disclosure, the keyboard 100 determines the target air pressure in the airbag 22, which corresponds to a desired tactile feedback when pressing the keycap 21 corresponding to the airbag 22.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A keyboard comprising:
a substrate;
a plurality of key structures each comprising:
 a keycap disposed on the substrate, the keycap adapted to move towards the substrate when the keycap is pressed, the keycap further adapted to move away from the substrate when the keycap is released;
 an airbag disposed between the keycap and the substrate, wherein the airbag deforms when the keycap moves towards the substrate, thereby applying a reaction force onto the substrate, the airbag returns to an original state when the keycap is released;
 a contact point disposed between the keycap and the substrate, and configured to generate an input instruction when the keycap contacts the contact point; and
 an air pump connected to the airbag, and configured to adjust an air pressure in the airbag by charging or discharging air from the airbag, so as to adjust the reaction force from the airbag to the substrate, thereby adjusting a tactile feedback when the keycap is pressed.

2. The keyboard of claim 1, wherein the air pump is configured to adjust the air pressure in the airbag to $P_0$ in an initial state; when the keycap contacts the contact point, the air pressure in the airbag becomes $P_1$, the reaction force from the airbag to the substrate is $F_1$, and a contact area between the keycap and the airbag is S; a target reaction force from the airbag to the substrate corresponding to the desired tactile feedback is $F_s$; when the keycap is released, the air pump is further configured to adjust the air pressure in the airbag to a target air pressure $P_2$, and the target air pressure $P_2$ satisfies formula of:

$$P_2 = \left| \frac{(P_1 \times S + F_1 - F_s) \times P_0}{P_1 \times S} \right|;$$

wherein after the air pressure in the airbag is adjusted to $P_2$, when the keycap is pressed by a same strength, the reaction force of the airbag applied to the substrate is the target reaction force $F_s$ after the keycap contacts the contact point, thereby achieving a desired tactile feedback.

3. The keyboard of claim 2, further comprising:

an air pressure sensor disposed in the airbag, and configured to sense the air pressure in the airbag in real-time;
a pressing force sensor disposed on the substrate, and configured to sense the reaction force from the airbag to the substrate; and
a controller configured to calculate the target air pressure $P_2$, control the air pump to charge air into the airbag when the target air pressure $P_2$ is greater than $P_0$, and control the air pump to discharge air from the airbag when the target air pressure $P_2$ is less than $P_0$.

4. The keyboard of claim 3, further comprising a valve, wherein the airbag is connected to the air pump through the valve, the valve is connected to the controller; and the controller is further configured to close the valve to maintain the air pressure in the airbag, and open the valve when the air pump is charging and/or discharging air.

5. The keyboard of claim 4, wherein the controller is further configured to record the target air pressure $P_2$ of the airbag, and adjust the air pressure in the airbag to the target air pressure $P_2$ each time before the user initiates operation of the keyboard.

6. The keyboard of claim 5, wherein the controller is further configured to generate a mapping relationship between the keycap of each of the plurality of key structures and the corresponding target air pressure $P_2$, and adjust the air pressure in the airbag of each of the plurality of key structures to the corresponding target air pressure $P_2$ based on the mapping relationship.

7. The keyboard of claim 3, wherein when an ambient temperature increases or decreases, the pressing force sensor senses that a maximum reaction force of the airbag applied to the substrate becomes $F_2$, the air pressure sensor senses that the air pressure in a deformed airbag changes to $P_3$ and the air pressure in an undeformed airbag changes to $P_4$, the controller is further configured to control the air pump to adjust the air pressure in the undeformed airbag to be $P_2'$, and $P_2'$ satisfies formula of:

$$P_2' = \left| \frac{(P_3 \times S + F_2 - F_s) \times P_4}{P_3 \times S} \right|$$

wherein after the air pressure in the undeformed airbag is adjusted to $P_2'$, when the keycap is pressed by a same strength, the reaction force of the deformed airbag applied to the substrate remains $F_s$.

8. The keyboard of claim 3, when the strength of pressing the keycap increases or decreases, the pressing force sensor senses that a maximum reaction force from the deformed airbag to the substrate changes to $F_3$, and the air pressure sensor senses that the air pressure from the deformed airbag changes to $P_5$, the controller is further configured to control the air pump to adjust the air pressure in the undeformed airbag to be $P_2''$, $P_2''$ satisfies formula of:

$$P_2'' = \left| \frac{(P_5 \times S + F_5 - F_s) \times P_2}{P_5 \times S} \right|$$

wherein after the air pressure in the undeformed airbag is adjusted to $P_2''$, when the strength of pressing the keycap remains unchanged, the reaction force from the deformed airbag to the substrate remains $F_s$ when the keycap contacts the contact point.

9. The keyboard of claim 3, wherein each time the keycap is pressed, the pressing force sensor detects that a maximum reaction force from the deformed airbag to the substrate is $F_n$, and the air pressure sensor detects that the air pressure in the deformed airbag is $P_n$, the controller is configured to calculate the pressing force $F_0$ for pressing the keycap each time, and $F_0$ satisfies formula of:

$$F_0 = P_n \times S + F_n$$

wherein the controller is further configured to collect the pressing forces $F_0$ in a preset period of time that follow a normal distribution, and calculate an average pressing force $F_a$ of the pressing forces $F_0$ within a certain confidence interval, the controller is then configured to adjust the air pressure in the undeformed airbag to $P_2'''$, and $P_2'''$ satisfies formula of:

$$P_2''' = \left| \frac{(F_a - F_s) \times P_0}{P_1 \times S} \right|$$

wherein after the air pressure in the undeformed airbag is adjusted to $P_2'''$, during the preset period of time when the pressing forces $F_0$ follow the normal distribution, the reaction force of the deformed airbag applied to the substrate remains $F_s$ each time the keycap contacts the contact point.

10. The keyboard of claim 9, wherein the controller is further configured to store the pressing forces $F_0$ that follow the normal distribution and the corresponding average pressing force $F_a$ at different time periods each day, and adjust the air pressure in the airbag to $P_2'''$ corresponding to the average pressing force $F_a$ at a specific time period each day.

11. A method for adjusting a tactile feedback to a user operating a keyboard, comprising:
providing the keyboard comprising a substrate, a keycap disposed on the substrate, an airbag and a contact point disposed between the keycap and the substrate;
controlling an air pump to adjust an air pressure in the airbag to $P_0$ before the user initiates operation of the keyboard;
pressing the keycap to get in contact with the contact point, wherein the air pressure in the airbag becomes $P_1$, the reaction force of the airbag applied to the substrate is $F_1$, and a contact area between the keycap and the airbag is S;
providing a target reaction force $F_s$ of the airbag applied to the substrate corresponding to a desired tactile feedback; and
releasing the keycap, and controlling the air pump to adjust the air pressure in the airbag to a target air pressure $P_2$, and the target air pressure $P_2$ satisfies formula of:

$$P_2 = \left| \frac{(P_1 \times S + F_1 - F_s) \times P_0}{P_1 \times S} \right|;$$

wherein after the air pressure in an undeformed airbag is adjusted to $P_2$, under a condition that the keycap is pressed by a same strength, the reaction force of the airbag applied to the substrate is the target reaction force $F_s$ after the keycap is pressed to get in contact with the contact point, thereby achieving the desired tactile feedback.

12. The method of claim 11, wherein the air pump is configured to adjust the air pressure in the airbag to $P_0$ in an initial state; when the keycap contacts the contact point, the air pressure in the airbag becomes $P_1$, the reaction force from the airbag to the substrate is $F_1$, and a contact area between the keycap and the airbag is S; a target reaction force from the airbag to the substrate corresponding to the desired tactile feedback is $F_s$; when the keycap is released, the air pump is further configured to adjust the air pressure in the airbag to a target air pressure $P_2$, and the target air pressure $P_2$ satisfies formula of:

$$P_2 = \left| \frac{(P_1 \times S + F_1 - F_s) \times P_0}{P_1 \times S} \right|;$$

wherein after the air pressure in the airbag is adjusted to $P_2$, when the keycap is pressed by a same strength, the reaction force of the airbag applied to the substrate is the target reaction force $F_s$ after the keycap contacts the contact point, thereby achieving a desired tactile feedback.

13. The method of claim 12, wherein the keyboard further comprises an air pressure sensor and a pressing force sensor, the air pressure sensor is disposed in the airbag, and configured to sense the air pressure in the airbag in real-time; the pressing force sensor is disposed on the substrate, and configured to sense the reaction force from the airbag to the substrate;
the method further comprises:
calculating the target air pressure $P_2$;
controlling the air pump to charge air into the airbag when the target air pressure $P_2$ is greater than $P_0$, and controlling the air pump to discharge air from the airbag when the target air pressure $P_2$ is less than $P_0$.

14. The method of claim 13, further comprising:
recording the target air pressure $P_2$ of the airbag, and adjusting the air pressure in the airbag to the target air pressure $P_2$ each time before a user initiates operation of the keyboard.

15. The method of claim 14, further comprising:
generating a mapping relationship between the keycap of each of the plurality of key structures and the corresponding target air pressure $P_2$, and adjusting the air pressure in the airbag of each of the plurality of key structures to the corresponding target air pressure $P_2$ based on the mapping relationship.

16. The method of claim 13, wherein when an ambient temperature increases or decreases, the pressing force sensor senses that a maximum reaction force of the airbag applied to the substrate becomes $F_2$, the air pressure sensor senses that the air pressure in a deformed airbag changes to $P_3$ and the air pressure in an undeformed airbag changes to $P_4$;
the method further comprises:
controlling the air pump to adjust the air pressure in the undeformed airbag to be $P_2'$, and $P_2'$ satisfies formula of:

$$P_2' = \left| \frac{(P_3 \times S + F_2 - F_s) \times P_4}{P_3 \times S} \right|$$

wherein after the air pressure in the undeformed airbag is adjusted to $P_2'$, when the keycap is pressed by a same strength, the reaction force of the deformed airbag applied to the substrate remains $F_s$.

17. The method of claim 13, when the strength of pressing the keycap increases or decreases, the pressing force sensor senses that a maximum reaction force form the deformed airbag to the substrate changes to $F_3$, and the air pressure sensor senses that the air pressure from the deformed airbag changes to $P_5$;

the method further comprises:

controlling the air pump to adjust the air pressure in the undeformed airbag to be $P_2''$, $P_2''$ satisfies formula of:

$$P_2'' = \left| \frac{(P_5 \times S + F_5 - F_s) \times P_2}{P_5 \times S} \right|$$

wherein after the air pressure in the undeformed airbag is adjusted to $P_2''$, when the strength of pressing the keycap remains unchanged, the reaction force that the deformed airbag applies to the substrate remains $F_s$ when the keycap contacts the contact point.

18. The method of claim 13, wherein each time the keycap is pressed, the pressing force sensor detects that a maximum reaction force from the deformed airbag to the substrate is $F_n$, and the air pressure sensor detects that the air pressure in the deformed airbag is $P_n$;

the method further comprises:

calculating the pressing force $F_0$ for pressing the keycap each time, and $F_0$ satisfies formula of:

$$F_0 = P_n \times S + F_n$$

collecting the pressing forces $F_0$ in a preset period of time that follow a normal distribution, calculating an average pressing force $F_a$ of the pressing forces $F_0$ within a certain confidence interval, adjusting the air pressure in the undeformed airbag to $P_2'''$, and $P_2'''$ satisfies formula of:

$$P_2''' = \left| \frac{(F_a - F_s) \times P_0}{P_1 \times S} \right|$$

wherein after the air pressure in the undeformed airbag is adjusted to $P_2'''$, during the preset period of time when the pressing forces $F_0$ follow the normal distribution, the reaction force of the deformed airbag applied to the substrate remains $F_s$ each time the keycap contacts the contact point.

19. The method of claim 18, further comprising: storing the pressing forces $F_0$ that follow the normal distribution and the corresponding average pressing force $F_a$ at different time periods each day, and adjusting the air pressure in the airbag to $P_2'''$ corresponding to the average pressing force $F_a$ at a specific time period each day.

* * * * *